(12) United States Patent
Rolnik et al.

(10) Patent No.: US 7,574,237 B2
(45) Date of Patent: Aug. 11, 2009

(54) METHOD AND APPARATUS FOR CHANGING AT LEAST ONE COMMUNICATION PARAMETER FOR A COMMUNICATION DEVICE

(75) Inventors: Robert C. Rolnik, Southlake, TX (US); Andrew Wilken, Bedford, TX (US); Douglas Deeds, Fort Worth, TX (US); Steven W. Bryant, Richardson, TX (US); Monika Bryant, Richardson, TX (US)

(73) Assignee: Nokia Corporation, Espoo (FI)

( * ) Notice: Subject to any disclaimer, the term of this patent is extended or adjusted under 35 U.S.C. 154(b) by 1313 days.

(21) Appl. No.: 10/144,321

(22) Filed: May 6, 2002

(65) Prior Publication Data
US 2003/0207701 A1    Nov. 6, 2003

(51) Int. Cl.
*H04M 1/00* (2006.01)
*H04B 1/38* (2006.01)

(52) U.S. Cl. .................. 455/564; 455/565; 455/566; 455/575.1; 379/93.01; 379/93.27; 379/433.06; 379/433.07

(58) Field of Classification Search .............. 455/564, 455/565, 566, 575.1; 379/93.01, 93.27, 433.06, 379/433.07
See application file for complete search history.

(56) References Cited

U.S. PATENT DOCUMENTS

| | | | | |
|---|---|---|---|---|
| 4,736,410 A | * | 4/1988 | Nishida et al. ............. | 455/564 |
| 5,233,333 A | * | 8/1993 | Borsuk ..................... | 345/660 |
| 5,872,837 A | * | 2/1999 | Johnson .................. | 379/93.27 |
| 5,946,636 A | | 8/1999 | Uyeno | |
| 6,195,707 B1 | | 2/2001 | Minh | |
| 6,198,939 B1 | * | 3/2001 | Holmstrom et al. ........ | 455/566 |
| 6,332,024 B1 | * | 12/2001 | Inoue et al. ............. | 379/433.06 |
| 6,453,169 B1 | * | 9/2002 | Maloney ................. | 455/575.1 |

* cited by examiner

*Primary Examiner*—Stephen M D'Agosta
(74) *Attorney, Agent, or Firm*—Alston & Bird LLP

(57) ABSTRACT

A system and method to obtain a nickname for records, particularly records having number fields. A set of triplets is identified in a record 401. Criteria, at least at a strict level, is set to establish that used triplets are many, and hard to avoid 403. Using this criteria, triplets may be processed in order 405. Each triplet is checked against the criteria 407. Avoidance of the used criteria, i.e. that the current triplet is not used, enables the triplet to be associated with the record 413. Failure to avoid the used criteria enables a loop to continue if the exit criteria 409 is not met. A next triplet is obtained 410 if the inner loop continues. Otherwise, a check to get a more relaxed used triplet criteria is made 411. If a relaxed used triplet criteria is available 411, the relaxed used triplet criteria (having fewer used triplets) is used 415, and an outer loop continues with processing of the list of triplets 405 again. Otherwise, a triplet may manually be associated with the record 417.

68 Claims, 5 Drawing Sheets

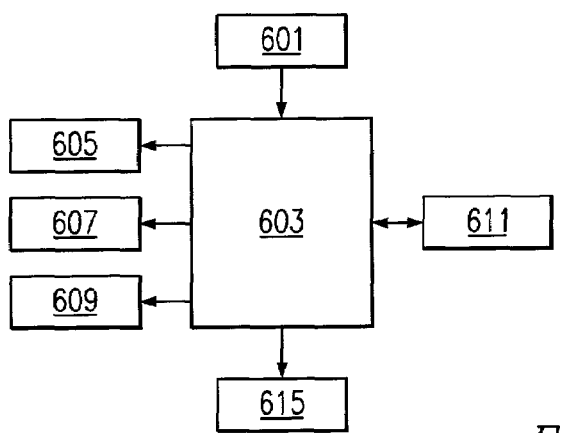
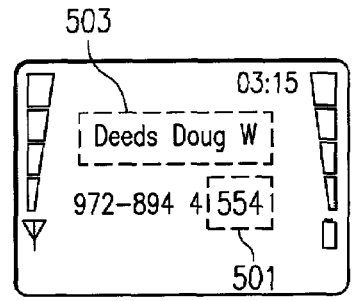
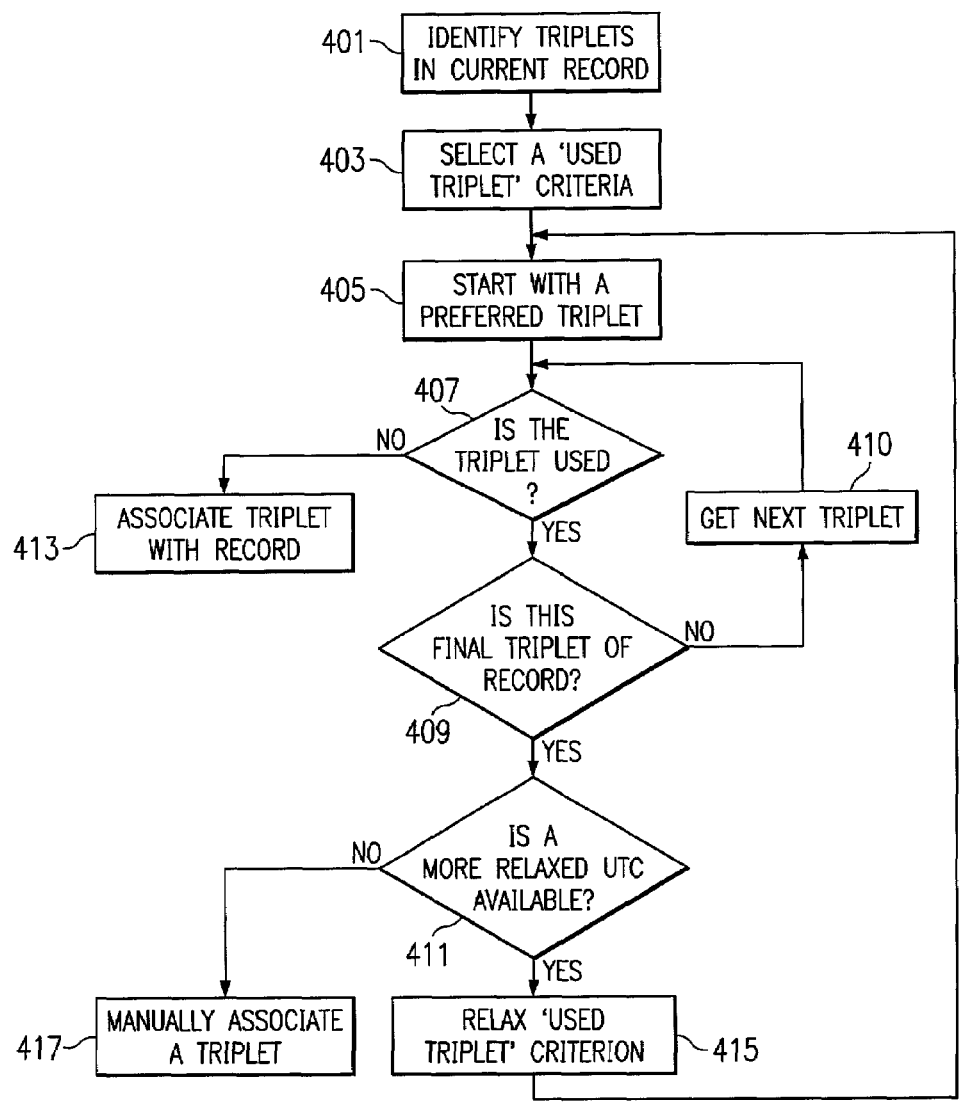

METHOD AND APPARATUS FOR CHANGING AT LEAST ONE COMMUNICATION PARAMETER FOR A COMMUNICATION DEVICE

FIELD OF THE INVENTION

The invention relates generally to user interfaces to complex machinery. More particularly, the invention relates to handheld and desktop shortcuts to functions, databases, and communications nodes.

URL (Uniform Resource Locator) completion has been known to operate as follows. The first keystrokes entered in the address field of a browser are compared to a list of URLs (history list) that may have previously been visited. The list of visited URLs is read from most recent to oldest. If an URL is found from the history list that has characters at its beginning that match the first keystrokes, the browser suggests that URL by displaying the a list of URLs having common first beginnings that match—usually in the form of a drop down list of matching URLs.

In U.S. Pat. No. 5,722,088 "Automatic Prefix systems and methods for mobile radiotelephones", it is shown: "In response to user entry of an extension, such as four or five digits followed by the "send" key, the stored default automatic prefix is retrieved and a radiotelephone communication is initiated to the destination telephone using the retrieved default automatic prefix followed by the user-entered extension." Part of the '088 patent's success owes to the fact that it enters a disambiguation routine when either a four or five digit extension is entered. Requiring at least four digits greatly improves the likelihood of having a unique 'hit' among a random distribution of strings.

U.S. application Ser. No. 09/875,493 includes a method for identifying in a table of candidate records, each record having at least one field, comprising the steps of receiving a partial string; substring matching the partial string to at least one
  candidate record; and receiving a command to perform a function on at least one field of the candidate record.

A disambiguation algorithm that relies solely on the first user entered digits of a telephone number to identify a unique number in a list of numbers is problematic. Chief among the difficulties is the fact that, in spite of the recent area code divisions in the United States, a person's contacts still are several to an area code. Thus, in a database of dozens of phone numbers, a selection or disambiguation routine will still turn up several hits following the entry of the three digits of a telephone number. The situation can be complicated when there are several contacts that live in the same neighborhood, and share a common exchange number. In many cases it may require an entry of 7 digits before a unique match is found in a phonebook.

Glypho: A glypho is a discrete signal that may have a start and an end, wherein the glypho may comprise inputs such as
  a button press and release;
  a rotation of a flip or extension of a sliding cover;
  movement of a roller or joystick;
  a recognized part of speech; or
  a stroke on a digitizer tablet.

A glypho may be processed to provide an associated key-down event and an associated key-up event.

The key-down event may occur substantially at the moment that two conductors underlying a button or key are closed to form a circuit.

The key-up event may occur substantially at the moment that two conductors underlying a button or key are separated, thus breaking a circuit.

The key-down event may be a time when a recognition software detects the beginning of a spoken word, e.g. a numeric digit.

The key-up event may be a time when one word has finished being enunciated, as detected by a recognition software.

The key-down event may be a time when a recognition software detects the beginning of a human-producible sound, e.g. a cough, or tapping sound or a clicking of the tongue on the upper palate.

The key-down event may be a time when a stroke on a digitizer tablet begins.

The key-up event may be a time when one or more strokes on a digitizer tablet ends, wherein the one or more strokes on the digitizer tablet are recognizable as a arabic or other representation of a digit or other character.

A glypho may be a signal provided by a key associated with a dual tone multiple frequency input commonly associated with modern telephones. Such a glypho is called a DTMF Associated Key signal, or DAK signal.

A key used to make a DAK signal, or a DAK, may be marked with the digits 1, 2, 3, 4, 5, 6, 7, 8, 9 and 0, as well as the star, (*) and pound (#) in most English speaking countries. Other countries and cultures may use different but equivalent markings. DAKs are typically arranged in a substantially grid-like pattern, with some allowances for fashionably colored keys of varying sizes and shapes. A key mapped to a DAK signal producing circuit may be known as a 12-key. A DAK producing circuit may be configured to provide DTMF tones to a local speaker, however, it is known that, particularly cellular telephone applications, a telephone may be configured not to produce DTMF tones when a 12-key is pressed. So a broader definition of a DAK signal may be any key that has traditionally been assigned to produce a DTMF signal based on at least one of the markings on the key. Note, that although the word key is used, it is known in the art to form contiguous elastomer keys that may close circuits depending upon what portion of the elastomer is pressed. Hence, a key may be that portion of the elastomer operable to close that circuit, and consequently, those markings closest to such an active portion of the elastomer. In other words, a single elastomer may form a part in several keys.

In many a mobile station design, there are DAKs, as well as function keys. Nearly always, there is a dedicated call initiation key, often marked with a 'send' marking, and sometimes called the talk-key. There are contexts where a dedicated call initiation key may be disabled. Other keys may be assigned a call initiation function, however, to-date, such keys have been assignable to only one preset telephone number. For example, in the Nokia mobile phone, a 'one-touch' programming of a DAK may be done wherein following the programming, a user has merely to press, and hold in the key for about a second, to set the number to be called and command or request that radio and network resources be allocated to make the call.

Similarly, in some Nokia mobile phones, a pound ('#') marked key has been assigned a 'look-up' function, wherein the pressing of the key causes a telephone or other entry from the 'phone book' to be called from a memory location specified with one to three digits. The telephone number then is stored in a scratch pad or other memory register that may be used as the called number when a user next presses the dedicated call initiation key (DCIK). Never before has the pound key operated to command both a 'look-up' and 'call initiate'.

A phone book is a database of one or more records having as a key field an alphanumeric string, commonly associated with the name of an individual or business, and at least one second (telephony) field comprising one or more strings of telephony commands, which may be represented by the characters 0, 1, 2, 3, 4, 5, 6, 7, 8, 9, #, *, p, w, + which may correlate to the ordinary dialed digits of a telephone number, or the DTMF tones necessary to navigate a Interactive Voice Response (IVR) system. A telephony command may include: 1) pauses between issued DTMF tones; 2) programmed halts in issuing DTMF tones (waits) dependent upon a key press for continuation; and 3) international dialing prefixes, e.g. 011. Each such command may be symbolically represented and stored in one or more of the telephony command fields. Other fields may be included in each record, e.g. email addresses, associations with particular ring-tones among others. The ability to associate a record, and thus a telephone number, is particularly helpful in that a phone, by way of the automatic number identification (ANI), may provide a quiet ring or no ring at all for particularly troublesome inbound calls. The telephony field may double as an address for dispatching Short Text Messages (SMS) popularized in the Global System for Mobiles (GSM) standard. In other words, most of the string in the telephony field may identify a wireless device according to a text messaging format, which may include text messaging formats other than GSM. The phone book is an extendable database, i.e. other manufacturers may add additional field types as suits their needs. Each phonebook record may be addressed by conventional computer methods using a digital address, which may include relative addressing. Most or all of such a database may be stored on a SIM card.

Mobile phones, a type of mobile station, come in several varieties or form factors. A common type of mobile phone configuration is the 'candy bar' configuration, wherein the chief components of the mobile phone, once assembled, comprise a substantially monolithic device that is arranged in an oblong shape. Examples of the candy bar include the Nokia 6160 mobile phone and the Nokia 8290 mobile phone. Flip-phones are another form factor wherein there is a generally flat cover that is hinged to the base of the mobile phone and covers most of the keypad when the phone is not in use. Frequently there is a sensor that detects if the flip is open or closed on such phones. Another keypad protecting form factor is the slide-cover form factor, wherein there is a slidable cover on the bottom half of the phone that may be extended to reveal the buttons underneath. Several other configurations exist that operate to protect the buttons of the keypad from inadvertent pressing, e.g. when the phone is stored in a purse or pocket. Any signal detected as a consequence of moving a cover or flip or any substantial portion of the mobile station may be a geometry configuration change signal, or a configuration change for short.

The candy-bar type phones deal with the problem of inadvertent key presses by providing for a 'key-lock'. Further details of how key-locks function may be found in Portable radio telephone which terminates an electronic keypad lock function upon sensing an incoming call (U.S. Pat. No. 5,241,583). The key-lock on a Nokia 8290 phone is activated, e.g., by pressing the 'menu' soft-key, followed by the star (*) key. Once key-locked, only key-locked functions may be activated. Thus, as a rule, pressing any key on a phone that is keylocked while cause no response to the phone except possibly for indications that a key-lock is in place, and possibly instructions how to remove the keylock. An exception to the rule is that a preset one or more key-combinations may end the keylock. In the case of Nokia mobile phones, the unlock key combination is a softkey plus the star (*) key. Note that a softkey is a key without significant notations on it except for a marking that may suggest that the function operate according to a contemporaneously displayed text on a nearby display. Thus a softkey signal is a signal produced by at least pressing on such a key.

Another exception to the rule that pressing a key does little more than inform a user (if even that) which keys to press to remove the keylock is that there are some functions that need to be accessed in a hurry, even if a keylock is in place. Such functions include: a) the ability to accept an incoming call by pressing any key ('583 patent); and b) the ability to enter a network-specific (e.g. United States, as opposed to a German) 3-digit emergency phone number (e.g. 911) and press 'send' to start the call. A key-lock function is thus defined as any function to receive, in response to a key-press, a voice call for immediate two-way real-time audio while the key-lock is on; or to make an emergency call to a short-length, network recognizable emergency dispatch service while the key-lock is on.

Another species of functionality on a communication device is the ability to show various status indicators on a display, or otherwise notify of environmental changes. Examples of this include the ability to display current received signal strength from a hosting network of wireless infrastructure; ability to display battery charge levels; ability to display time; and abilities to display recent and current call and voice messaging activity. Generally this type of functionality are known as status-reporting functions. Because displayed icons, bars, and sounds may be presented during keylock as well as without keylock, these status-reporting functions are not considered keylock functions, although such status reports may be displayed or sounded during operation of, e.g. an emergency call activated while the mobile phone is in keylock.

An unlocked function is any function that is not a keylock function. Thus, by use of one or more keys, a user may toggle between the two states of key-locked and key-unlocked, wherein in the key-locked state, at least keylock functions may be operated, although status-reporting functions may continue to be available. In the key-unlocked state, the unlocked functions are available, while optionally continuing to provide the status-reporting functions. Interestingly, key-lock functions may also operate while the mobile station is in the key-unlocked state.

To better explain the distinction between unlocked function and locked function, take as an example the entry of 911 while a phone is in a locked state. Pressing '9' does nothing visible on the screen. Pressing a first '1' does nothing visible on the screen. Pressing the second '1' causes the number 911 to be displayed, although the phone continues in its locked state. The phone then may respond only to one additional keystroke to make the call occur—the 'talk', sometimes known as the 'send', button. Various steps are carried out when the 'send' button is pressed, e.g. requesting radio resources, receiving acknowledgements from the network, making call progress indications.

A dilemma faced when designing a mobile station, is how to assure rapid, error-free dialing of numbers, particularly favorite numbers, while eliminating inadvertent keystrokes from causing communication attempts. Part of the complexity of dialing numbers occurs due to the ever-growing number of telephony devices in the U.S. and other countries. Frequent area code splits and overlays have resulted in even local calls requiring the dialing of all digits (10) to unambiguously indicate to the conventional PSTN the intended called party. This causes greater opportunities for mistakes and distraction for people dialing such numbers.

One solution to this problem has been the ability to store and recall phone numbers based on an alphanumeric (which may include the ASCII characters) string associated with each telephone number. This correspondence between alphanumeric name and telephony number, or telephony instruction, forms the basis for the phonebook database, and operates as a largely convenient way to look up a called party. Typically such a database is arranged largely in alphabetic order, so it is relatively easy to peruse the database by entering the first one or two characters of a person's name (used as the alphanumeric string). Such a database starts to have drawbacks though when a phonebook contains 50 or more entries, particularly if the mobile station has a display capable of showing only 3-4 entries at a time. More specifically, there tends to be a large number of people in the U.S. with surnames that begin with 'S', e.g. Smith. In a conventional 12-key mobile phone, the 'S' symbol may be entered by repeatedly pressing the '7' key (which also bears the 'S' marking). Thus to access a list of names starting with the letter 'S', wherein the 'S' is considered a letter-heading, a user of a Nokia 8290 mobile phone enters the key associated with the 'name' function, plus the keypad key prominently marked '7' four times. If a database contained names such as in Table 1:

TABLE 1

| | |
|---|---|
| 1 | Scheufler Steve |
| 2 | Scheufler Norma |
| 3 | Scheufler Gerald |
| 4 | Scheufler Staci |
| 5 | Scheufler Scott |
| 6 | Smith John |
| 7 | Smith Mary | then selecting "Smith Mary" may take a large number of keystrokes: name; 7,7,7,7; and down-scroll×6 for a total of 11 keystrokes. Ironically, the goal sought for in creating a phonebook is abrogated in this instance, i.e. it takes 10 keystrokes to enter the "Smith Mary" phone-number using the conventional U.S. 10-digit telephone number scheme. Such inefficiencies begin to present themselves in phonebooks of 50 entries. In phonebooks of about 110 entries, it is not uncommon for at least two 'letter headings' to have a set of 10 or more entries. Additional complications occur when one considers that often a key-unlock combination of keys must be performed to even get to the point of looking up a phone-number in the mobile phone's phonebook database. Thus in the above example, if it were prefaced by the 'menu' and star (*) keys, would have a total of 14 keystrokes to unlock, look-up and initiate the call with the 'talk' button—16 if you include the strokes to lock at the end.

The present invention may expand the functions that may be accessed while a communication device is in a key-locked state so that even though a communications device may be key-locked, unlocked functions may be accessed. Functions thus triggered by pressing three or more keystrokes from the keylocked state, and restoring the keylock afterwards are known as semi-locked functions, and may include one or more unlocked functions as steps in obtaining the semi-locked function.

SUMMARY OF THE INVENTION

Use of timing data of received glyphos may remove ambiguity from button keypresses that successfully permits a mobile phone to reject spurious keypresses associated with chafing of a phone within a user's pocket or purse. It is these sorts of keypresses that an ordinary keylock was designed to thwart. Keypresses of particularly long duration, as well as lengthy pauses between keypresses are usually good indicators that a keypress is inadvertent. Thus, using timing criteria, many inadvertent keystrokes may be rejected, thus retaining the benefits of keylock, while adding an advantage that prefatory menu-star combinations (or other unlock strokes) are unnecessary to begin operating a keylocked mobile phone.

An embodiment of the present invention defines a method and apparatus which may associate three keypresses to a record, e.g. having a telephone number, wherein a database comprises a first record using a first series of three keypresses, comprising 1) selecting a triplet from triplets in the record and 2) pairing the selected triplet with the record.

An embodiment of the invention may change communication parameters of a communication including the steps of receiving a first key signal having a key beginning, end and duration; a second key signal having a beginning, end and duration; and a third key signal having a beginning, end and duration.

BRIEF DESCRIPTION OF THE DRAWINGS

FIG. 4 shows a flowchart of an embodiment having steps for associating a triplet with a record.

FIG. 5 shows an embodiment display that displays a highlighted triplet when an incoming communication occurs.

FIG. 6 shows a block diagram of a communication device that may carry out the functions and equivalents of the above figures.

DETAILED DESCRIPTION

Figure 1A:
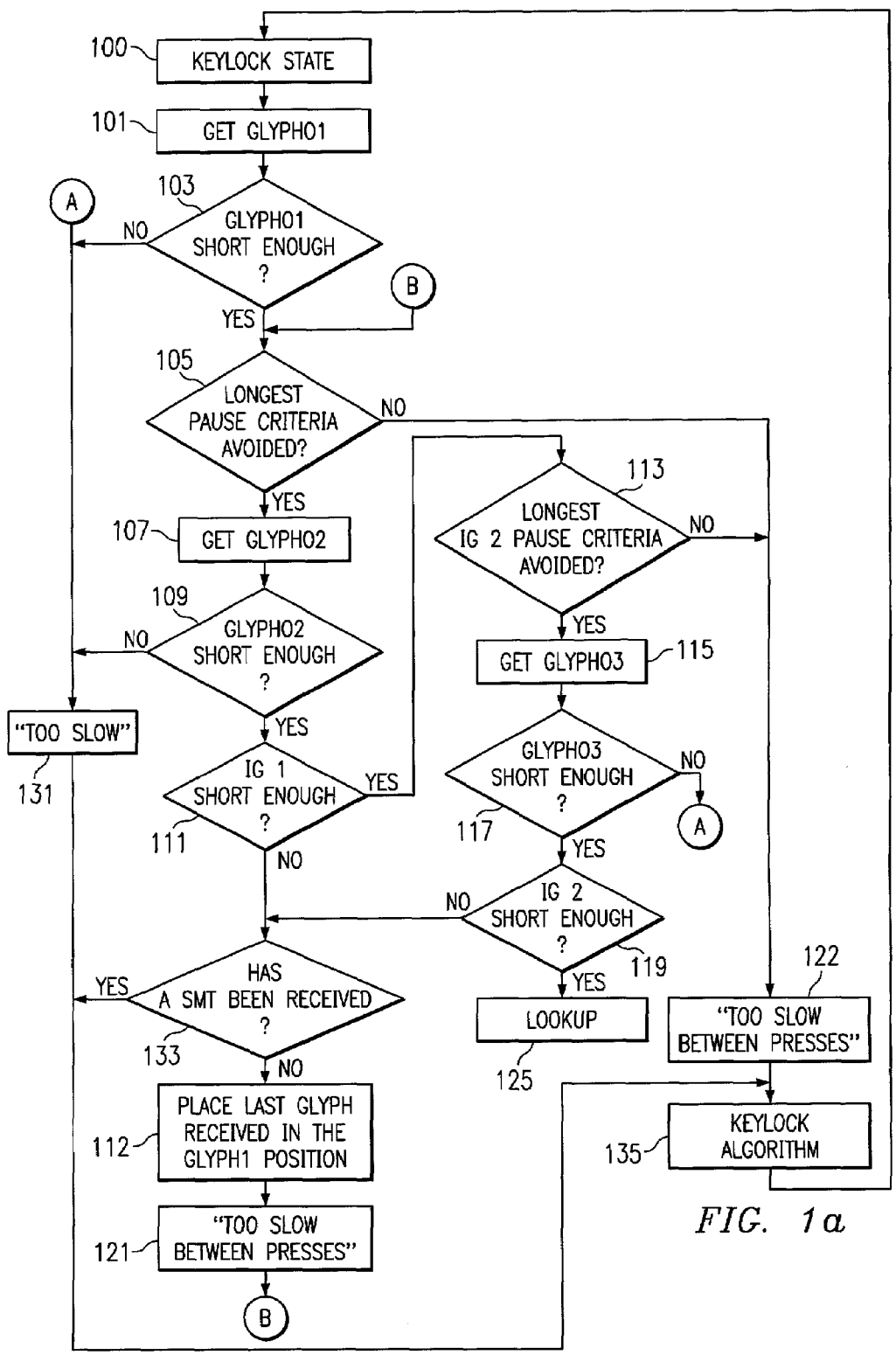
FIG. 1a shows a flowchart having steps for receiving three keystrokes or glyphos.

An embodiment of the present invention comprises a method and apparatus for rapidly looking up telephony instructions and other communications addresses, which may comprise a telephone number, even when a mobile telephone is in a keylocked state, and then making the call, while keeping distraction low.

To understand the embodiments, some definitions are required. A triplet is a set of characters consecutively stored in memory, including registers. A triplet includes both three characters as well as two characters having this trait. A three-key, or 3key, is a sequence of two or three inputs or signals, and connotes an order of the inputs, without taking into account durations of the signals or intervals between the signals. A three-key may be obtained by detecting an order to a series of glyphos. Where a glypho does not overlap another glypho, the order is straightforward. Where a glypho signal is present at the same time another glypho is present, to the extent it may be determined which glypho was present first, the first glypho (G1) may represent an earlier signal in a three-key. A glypho address may be an address used to lookup a database entry or record, e.g. a phonebook entry, wherein the timings of the glyphos may be used to further specify the phonebook entry or acts to be performed in connection with the phonebook entry. A glypho address may be an address used to lookup a database entry or record, wherein the timings between each glypho may be used to further specify the phonebook entry or acts to be performed in connection with the phonebook entry. An interglypho may be any period or duration following the conclusion or glypho end of a first glypho, and the glypho beginning of a second glypho. An interglypho may be limited only to durations satisfying a criteria, such as a duration under two seconds long. A pause may be limited to only durations satisfying an opposite criteria as used to define the interglypho, such as a duration two seconds long or longer. Thus a duration between glyphos may be either a pause or an interglypho, depending on what the interglypho-duration-criteria is set to. The interglypho-duration-criteria may consist only of a preset time demarking the difference between a pause and an interglypho duration.

An Interglypho may be characterized as middle or thin. A middle interglypho may be of a longer duration than a thin interglypho. A interglypho-middle-criteria may consist only of a preset time demarking the difference between a middle interglypho and a thin interglypho. The interglypho-middle-criteria may consist only of a time demarking the difference between a middle interglypho and a thin interglypho which varies according to circumstances.

A glypho may come in two forms: an address glypho and an action glypho. An address-glypho is a signal that may be human originated that connotes a digit or letter having a collating sequence as found, e.g., in modern alphabets. Examples of these include pressing of a button marked '8', or speaking the number 'seven', wherein the speech is recognized by a recognition software.

An action-glypho is a signal that may be human originated that connotes an action. On a mobile station, buttons marked star (*), pound (#), 'talk', 'end' may operate as action-glyphos when pressed. Similarly, in speech, the words 'go', 'call', 'dial' may operate as action-glyphos when recognized by a recognition software. Action-glyphos may also include signals generated by manipulation of unconventional controls on a mobile station, including slide extensions, flip extensions to the extent such are detectable by the mobile station—thus forming the basis for some geometry change signals. Action glyphos may also include strokes on any designated control surfaces of a graphics pad, as might be found on a personal digital assistant. An action glypho may include within its definition detecting characteristic orientations and accelerations of a device, provided that inclinometers or other orientation sensing devices provide such signals. An action glypho may also include navigation signals, such as produced when depressing a scroll-key, or moving a joystick. In addition, operating a softkey to produce a softkey signal may also be an action glypho.

The record-entry 3key assignment embodiment associates at least one record, of, e.g. a phonebook, with a 3key. A 3key may be selected from one of several 3key-spaces, depending on the preferences of the mobile phone owner. A useful 3key-space is the numbers 000 through 999, minus special-meaning triplets. Special-meaning triplets or SMT may include standard emergency telephone numbers recognized and routable by the PSTN, such as 911. Special meaning triplets may include triplets that may be inadvertently entered instead of the emergency telephone number, because, e.g. of the nearness of some keys to the emergency telephone number, e.g. 922 and 944 in relation to 911—particularly in view of the grid-like arrangement of some 12-key keypads. Another useful 3key-space is the number 00 through 99, i.e. two digit entries, which may be applicable to 3-keys comprised only of two key signals. The embodiment may associate a record with a 3key in the sense that the 3key may act as an index to a portion of a data structure. Thus data of the database may be addressed by a 3key.

A 3key having three digit places, may address a record, wherein a first, most significant digit place, may be obtained by detecting a pre-glypho signal having a pre-glypho signal beginning and a pre-glypho signal. The pre-glypho signal may be followed by at least two glyphos which may form the basis of the remaining two digit places. A final glypho may be an action glypho, which may trigger processing and lookup of the record based on at least the pre-glypho.

A subclass of triplets that may be special-meaning triplets may include triplets reserved for specialized commands that are not associated with a phonebook entry. Particularly helpful specialized commands that are not associated with a phonebook entry might include a command to change a profile of a mobile phone from sounding an alert upon receiving a call, to a profile that is silent when receiving a call. A specialized command may access a command or function that is commonly available by using the 'menu' or other command and configuration type of key.

Special-meaning triplets or SMT may include standard emergency telephone numbers recognized and routable by the PSTN, such as 911. Special meaning triplets may include triplets that may be inadvertently entered instead of the emergency telephone number, because, e.g. of the nearness of some keys to the emergency telephone number, e.g. 922 and 944 in relation to 911—particularly in view of the grid-like arrangement of some 12-key keypads. Special meaning triplets, when entered in daily use of the communication device, may provide feedback visible on a display or otherwise that the triplet is unassigned and perhaps direct the user to dial 911 for emergencies.

Under a relaxed criterion defining a "used triplet", once a 3key address is assigned or associated with a record, that 3key address is considered a used triplet, unless reallocated or otherwise disassociated with the record. A SMT may also be a used triplet. A record may have at least one telephony number having consecutive digits. If multiple telephony numbers are in a record, one may be selected as primary. A first step may comprise selecting at least one triplet from the consecutive digits that is not a used triplet, wherein the consecutive digits are selected from the primary number. A second step may comprise pairing the at least one triplet with a 3key address field of the record or otherwise associating the triplet with the 3key record.

A valid 3key address thus may be a 3key address that is assigned with a record. A valid 3key address, may have a set of glypho addresses associated with it, wherein the timing data of each glypho address may further define particular functions to be performed in relation to a database record.

A strict criterion defining a "used triplet" may be that a used triplet may be the presence of the triplet in any of the primary telephony number fields of a database. An even stricter criterion defining a "used triplet" may be yet even broader—it may include the presence of the triplet in any of the telephony number fields of a database. Note that the phrase "presence in" is used synonymously with "appears in" as well as "stored in" in reference to an 'x' being 'present in' a 'y'. All these phrases simply mean that each digit of x is more than simply present in 'y' or other storage space, but rather each digit of the x appears in y in the exact same order, and adjacent one digit to the next. So, for a number such as 8171234567, wherein a triplet, for sake of this example, is three consecutive digits—the triplets present in the number are: 817, 171, 712, 123, 234, 345, 456, and 567. The triplet 246 is not present in the number 8171234567.

The second step may be repeated several times such that multiple triplets are assigned the same record, thus forming 3keys. The second step may be more selective, by selecting a single 3key from a preferred three-key space or by avoiding selecting from an un-preferred three-key space. A preferred three-key space would be those 3keys that may be entered very easily on a numeric keypad of a telephone, e.g. keys that line up in a row, such as 123, 987, 258 and the like. An un-preferred three-key space may include numbers that sound suspiciously like other numbers, e.g. where the last two digits end with a 'teen' sounding. This may include 314, 515, 913. Avoiding such combinations may assist voice recognition software. If a one-to-one correspondence between assigned 3keys and records exists, the database may be said to be numberized.

Because the association of a triplet that is uniquely found in a primary phone number may have some advantages, it may be helpful, where multiple unique triplets appear in the number, to preferentially select a triplet that, because of the local PSTN numbering system, has a fairly random distribution. In a U.S. numbering system, the first triplet of a phone number has a high propensity to be non-unique, particularly when later numbers are added to a user's database, simply because people have friends and associates in areas served by local area codes. For this reason, the second and third triplets may also show a distribution in the triplet space that is less random than other triplets found deeper in a 10-digit number. Thus a preference may exist—where multiple triplets meet a criterion for not being used triplets—to chose the one triplet appearing in the third, fourth, fifth, sixth, seventh or eighth places of a 10-place number, wherein for the example given above, the 123, 234, 345, 456, and 567 choices would be preferred over 817, 171 and 712. Moreover, because more localized exchanges, e.g. a third, fourth and fifth digit (xxxXXXxxxx) also may appear in multiple entries of a phonebook, a better random selection may be available by choosing between the two final triplets, e.g. 456 and 567 in the example above. A general purpose user interface that allows the user to select and customize the preferential selection of the triplets may be preferred.

It is likely that a pattern of using uniform area codes in the high significant digit places persists in non-U.S. jurisdictions. Hence, a very general way to improve the random distribution of used triplets is to select for association a triplet that appears in the lowest significant digits. That is, preferring a ninth triplet (e.g. in a 11 or more digit numbering system) over an eighth triplet, an eighth triplet over a seventh triplet, and so on. Because a phonebook telephony field may have characters other than digits, e.g. 'p' for short pauses, 'w' for a wait, the occurrence of such a character may signal that a last, or least significant triplet is the set of three digits that appear to the immediate left of the first of such non-digit characters. However, where an unbroken string of digits appears to the right of a non-digit, one or more of the unbroken strings of digits may also serve as a triplet. Thus it may be preferred to select a triplet in a low significant digit place.

An embodiment to use 3keys in practice may include receiving a set of glyphos and detecting if they match a glypho address. An embodiment may collect a set of three glyphos that have no pauses between them, i.e. no protracted delays between each glypho. Each glypho may be an address glypho. Since the intervals between glyphos (interglyphos) are small enough, they may be thin interglyphos or middle interglyphos. Thus an address glypho may comprise a first glypho, a first interglypho, a second glypho, a second interglypho and a third glypho, which may be represented in shorthand notation as 11111, where each digit place identifies the presence of either a glypho or an interglypho that occurs in sequence, wherein the lefthand digit is the first glypho received and the righthand digit is the third (and last) glypho received. If the occurrence of a middle interglypho or a thin interglypho is detected, then such an occurrence could be represented as a '1' in the former case and a '0' in the latter. Thus a glypho address having middle interglyphos may be represented as 11111, and a glypho address having thin interglyphos may be represented as 10101. If the first interglypho is a middle interglypho, and the second interglypho is a thin interglypho, then 11101 may represent that case.

The foregoing timing differentiated address glyphos may be too complicated for some users. A simplified version, not dependent on time may be used in that case. Instead, the use of an action glypho may select which way to operate on data addressed by the glypho address. The use of a scroll-key may have two or more levels. For example, a miniature joystick key may have four levels. This key may be used as a final key to a 3key, or in addition to a 3key, wherein receipt of the action glypho would produce a shorthand notation of 0 or 1 in the case of scroll-key, and a shorthand notation of 0, 1, 2, or 3 in the case of a four way joystick key.

Just as the interglyphos may have dual levels, so may the glyphos also have dual or additional levels based on the duration of the signal. Signal durations may vary particularly if the signal is produced by a key-down and then key-up of a button on a keypad. A middle glypho then has a duration that is longer than a thin glypho. Thus where all buttons are pressed rapidly, in an embodiment relying on button signals for glyphos, such a glypho address may be shorthand represented as 01010. Where all buttons are pressed for longer durations, such a glypho address may be shorthand represented by 11111. An action glypho may occur due to the opening of a flip cover to a phone, or the extension of a slide. To the extent that a user may vary the duration of such a signal, then a 1 or 0 notation may be applied to that signal as well.

A glypho address may also have a literal notation associated with it, e.g. 123, wherein each digit number of the literal notation are printed or otherwise associated with a button that is pressed. As noted earlier, a literal notation may have—as possible glypho addresses—literal notations of 000 through 999, or up to a thousand possible combinations. By adding the notation of the shorthand notation, there may be up to 32 sub-combinations for each glypho address. Assuming an embodiment were constructed that took into account both the literal notation and the shorthand notation, the collective notation for the glypho address may be represented as XXX-.BBBBB, where each 'X' is a base 10 digit of the literal notation, and each 'B' may be a binary digit of the shorthand notation. A glypho address stripped of the shorthand notation may be a 3key.

A set of signals may be received that may include at least one address glypho, in the cadenced embodiment. For glypho addresses comprised of three glyphos an algorithm may accumulate signals until sufficient signals are accumulated for further action, e.g. detecting if the signals match an glypho address. A simple implementation may apply a fixed, but user-definable, duration criterion that demarks a middle glypho from a thin glypho. A similar criterion may also be preset that demarks a middle interglypho from a thin interglypho, and demarks a pause from an interglypho. A more complex embodiment may relate the interval between glyphos to travel distances of a hypothetical user's thumb between keypresses, i.e. allowing a longer criterion for interglyphos created by successive keystrokes (keypad presses) between keys that are at opposite ends of a keypad. This would permit a user a longer time to reach across the keypad as compared to a situation where a thumb is simply reaching between to adjacent keys.

Input processing may begin with a mobile station in a state, which may be a keylocked state 100. The first step is to get a first signal 101. The signal may be tested to see if it is short enough to meet a duration criterion 103, i.e. a difference between a first glypho end and a first glypho beginning is measured as a first glypho duration. If not, an optional feedback signal may be provided 131. Such a feedback signal may state that the communication device accepts three-key keylock override inputs. Further processing may include a keylock function algorithm 135, wherein the signal may be accumulated with other signals to operate a keylock function (e.g. dial 911), or trigger a function associated with a special meaning triplet. The keylock algorithm may include displaying that the communication device is keylocked, e.g. "Press Menu, then *". There may be multiple delay criteria to detect the presence of a pause at this point. If the longest pause criterion is avoided 105, processing continues to accumulate 107 a second signal. The second signal may be an address glypho having an address glypho beginning, address glypho ending and an address glypho duration. If the second signal is short enough to meet a duration criterion 109 further analysis of the signal continues, otherwise, a feedback signal 131, followed by a keylock function algorithm 135 may take over. The interval between the first signal end and second signal beginning may be measured 111 to obtain a first interglypho. If the interval is long enough, then it may be considered a pause. If a pause is detected 111, the second signal may be tested to see if it and prior received signals make up a SMT 133. If so, the keylock algorithm 135 sorts out if it is a 911 emergency call, request for stored medical/biographical information etc. Otherwise, the last signal received may be stored as glypho 1 112, with all beginning time, ending time and duration of the second signal becoming the beginning time, ending time and duration of glyphol—effectively disposing of the first signal, and accumulating the second signal detected in "get glypho 2" 107. This leaves only a single signal accumulated at this point—the second signal—which is now known as glypho 1.

In addition, processing may go to a display of "Too Slow Between Presses" 121, followed by re-entry to the process of attempting to accumulate a second signal, comprised of checking for pauses 105 and getting glypho 2 107.

If the interglypho criteria test 111 succeeded, processing continues with measuring to see if a pause occurred that is too long for a second interglypho period (IG2) 113. A pause occurring at this point may cause a report of "too slow between presses" 122 to a display, then a return to a keylock function algorithm 135. A third signal may be accumulated 115. If the signal meets a final duration criterion 117, a feedback 131 plus a keylock function algorithm 135 may occur.

The final glypho duration criterion 117 may be a test to see if the last glypho received is short enough to suggest that the glypho was not inadvertently pressed. However, it may be sufficient that the earlier glyphos, e.g. a first glypho and a second glypho, e.g. an address glypho (AG1), both meet the necessary timing criteria, in which case the final duration criteria 117 may be a test to see if the last glypho received is long enough to suggest that the user intends this last glypho, together with the earlier glyphos be used as a glypho address. If it is desired that a communication device be even less discriminating, i.e. reject even fewer entries as inadvertent, then step 117 may be eliminated in its entirety, and the mere fact of receiving a key-down in the get glypho 3 step 113 may operate to permit further processing in a test to see if the second interglypho is of proper duration 119.

If the third signal a duration criterion 117 passes, then a test of the second interglypho may occur 119. If the interval between glypho 2 and glypho 3 is too long 119, processing then may test to see if glypho 3 and prior received signals make up a SMT 133. If so, the keylock algorithm 135 sorts out if it is a 911 emergency call, request for stored medical/biographical information etc. Otherwise, the last signal received may be stored as glypho 1 112. Step of replacing glypho 1 may be followed by a display of "Too Slow Between Presses" 121. Continuing processing to get glypho 2 via a pause test 105 and a glypho accumulation 107 re-occurs. Otherwise, if step 119 identifies the IG2 as short enough, the accumulated glypho 1, glypho 2 and glypho 3 may be used as a key to lookup 125 to see if there is a matching glypho address in among the database records, wherein glypho 1 may be a first glypho (G1), glypho 2 may be an address glypho (AG1), and glypho 3 may be a second glypho (G2).

A special meaning triplet may include entering of a generally accepted medical and/or biographical record. One such triplet that may be accepted and remembered among emergency medical technicians, doctors and nurses might be the sequence of pound (#), pound (#), star (*) from an ordinary 12-key keypad. This ##* triplet would work with or without a keylock on. Unlike using 911 to override a keylock with an immediate call after pressing send, a SMT assigned to a medical and/or biographical record would not make a call, but provide, on a display or otherwise, essential details, e.g. for an emergency use, to assist treatment or body recovery. Setting a message in such a medical and/or biographical record (MABR) would be accomplished by means known in the art, e.g. by entering alphanumeric information at an appropriate prompt on the communication device. Use of a SMT may be detected in a SMT detection step 133, or in a keylock algorithm step 135 of FIG. 1a. Output of any medical and/or biographical record may occur during the keylock algorithm 135. Some uses of the information might include parent's names, for a child user that carries the communication device embodiment. Another use might be to indicate a medicine prescription schedule. Yet another use might be to identify doctor's names and phone numbers, plus medical condition of the mobile station user. Still another use might be to identify next of kin, or holders of a medical power of attorney. Allergic substances may also be listed in such a record. Alternate outputs may be available in case a mobile phone were damaged. The same MABR may be output via localized wireless links, e.g. infrared, or via a speaker in a mobile phone handset.

Figure 1B:
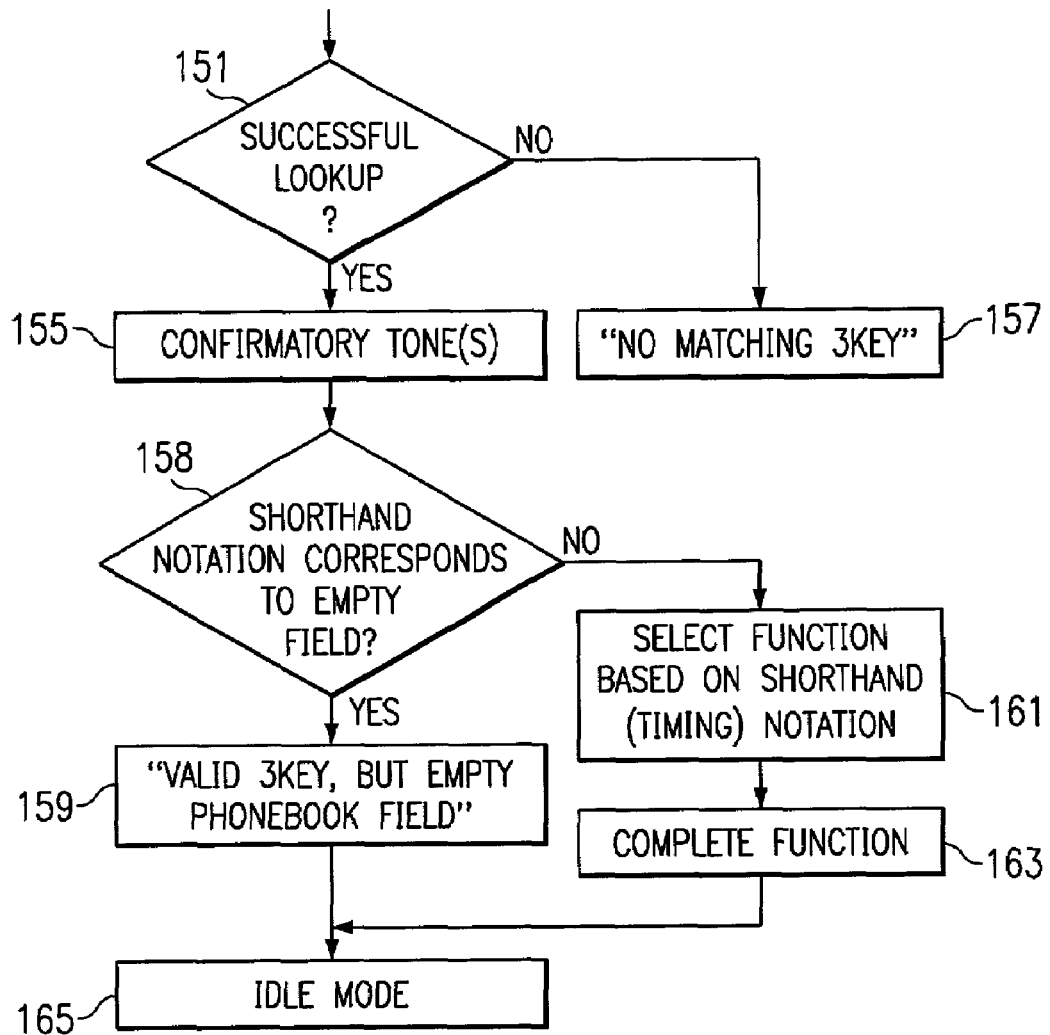
FIG. 1b shows a continuing flowchart for handling matching addresses in a database.

FIG. 1b shows a handling of a lookup of the glypho signals in a phonebook or other database. If the timing of each glypho and between glyphos is unimportant, then one or more of the glyphos may be used to look up a database record. Thus, the lookup algorithm 151 could operate solely on the XXX, or literal notation associated with the glyphos. A successful lookup of XXX in the database may trigger the unlocked function to dial the telephone number in the record and request communication resources. Contemporaneously, a confirmatory sound or vibration 155 may be made, which may include making a sound associated with the called party, e.g. the name of the person, or a ringtone associated with that person. To further assure to the user of the mobile station the identity of the called party, the full phone number of the called party and even the name of that party may be displayed to a display by means known in the art. A failure to match the glyphos to a database record may be accompanied by a sound, vibration or other output to indicate that a faulty match occurred. If sufficient faulty matches occur within a given time period, the mobile station may be moved from a semi-keylocked state to a keylocked state.

A more sophisticated look-up algorithm might take into account the up to five-bit long shorthand notation and treat the durations of each keypress as meaningful. For example, if all timings are in the 'thin' range (00000 using the shorthand notation), a call to a primary mobile phone number found in the record might occur, wherein the primary phone number may be a mobile phone number. Other functions, which may change one or more communication parameters of the host communication device, may be assigned as in table 2:

TABLE 2

| Shorthand Notation: | Function: |
| --- | --- |
| 01000: | Dial the home phone number, if available, |
| 10000: | Dial the work phone number, if available, |
| 00100: | Set the profile for calls received from a phone number to silent, if available (effectively ignoring the caller); |
| 00010: | Reconfigure the database of telephony numbers, e.g. by setting the profile for calls received from at least one phone number of the matching record to provide for loud ringtones; |
| 11111: | Provide an SMS edit screen with addressing to the mobile phone of the record, if available; |
| 10001: | Detect a presence data corresponding to a phone or other device addressable by a record field, if available, E.g. see if a user is busy by using algorithms specified in Wireless Village; |
| 10101: | Dispatch an email in a format associated with the record to an email address associated with the record, if available; |
| 00011: | Make a transport protocol inquiry, e.g. look up a web-site or a WAP page, if available; |
| 00001: | Transmit a signal via short range wireless; |
| 10111: | Dial a calling-card preface, followed by a telephony field of the record. |

Many other functions may be associated with the timings of the entries. A suitable confirmatory tone 155 might be to make a low beep for each '0' in the notation, and a high beep for each '1' in the notation, thus confirming to a dialing user which telephone number an attempt to call is being made to. The confirmatory tone may be substituted with one or more vibrations for a mobile station equipped with a vibrate motor. In addition a confirmatory tone may occur following each glypho and interglypho in the glypho collection process of FIG. 1a.

A failed match, might produce a feedback comprising either a tone or a displayed message or both 157.

A determination of a valid 3key address, but an absence of the field in the record upon which the algorithm is to work 158 might pass processing to an appropriate feedback of "Valid 3key, but empty phonebook field" 159. For example, where a shorthand notation of 00011 was detected, but no web-site or WAP page field (see table 2) was stored in the database, a more meaningful feedback of "Valid 3key, but empty WML/WWW field" 159 might occur.

If both a successful lookup 151 and a failure of the shorthand notation to correspond to an empty field 158, then a function may be selected based on the shorthand (or timing) notation 161. The function may be one of three varieties: a) configuration change, b) cellular telephony including voice or data and queries to a fixed network, or c) local wireless transmission or reception. The function may be initiated and completed 163 fairly rapidly, as would setting the profile for calls received from a phone number to silent. Some functions may have a user-initiated completion 163, such as may occur when a user initiates a call with a 3key, and then pushes the 'end' key or its equivalent as may occur in a mobile phone embodiment. Frequently, a completed function may be accompanied by a feedback signal to a user, e.g. when sending a SMS, it is common for the text "Message Sent" to appear. The step of completing the function 163 may include a delay sufficient for a user to understand any displayed text, which may accompany a function operation. A successfully completed function may not occur if a mobile station is set to retry if wireless system resources are congested or otherwise unavailable. For example, a call attempt may be tried, fail, and then retried seconds later. Such a process may repeat for minutes. A completion of such a function may occur when a mobile station obtains wireless resources and call progress occurs and concludes. A completion of such a function may occur if a user presses an "end" button and one or more attempts are aborted.

After completing a function, the mobile station may enter an idle mode 365, which may include the keylocked state 100 of FIG. 1a.

During operation of a call, as may be initiated in the select function step 161, normal functions associated with a call would continue to be available, e.g. volume controls, dialing a third party for three-way calls, muting, etc.

In like manner, when a SMS or other message is dispatched by a 3key while the mobile phone was in keylock, the completed dispatching of the SMS, either automatically, or at the close of editing the SMS, the phone may revert to keylocked state.

In addition to the keylocked state, there are at least two other states that 3keys may be meaningful. The first state is a conventional unlocked idle state of a mobile phone. From this state, typically each numeric key pressed results in a number being added to the display which may be edited by the user in case a mistake is made. Usually, in the prior art, a user is permitted to move a cursor back and forth over a tentatively entered number by using a scroll-key, which may have some arrow indicia marked on it. It is very rare for an error to occur in the first three digits, so having the ability to edit while only three-digits is visible is almost useless in prior art mobile stations. Idle unkeylocked states may include states that occur when a mobile station is charging; and states that give details of a recently received call or text message.

Figure 2A:
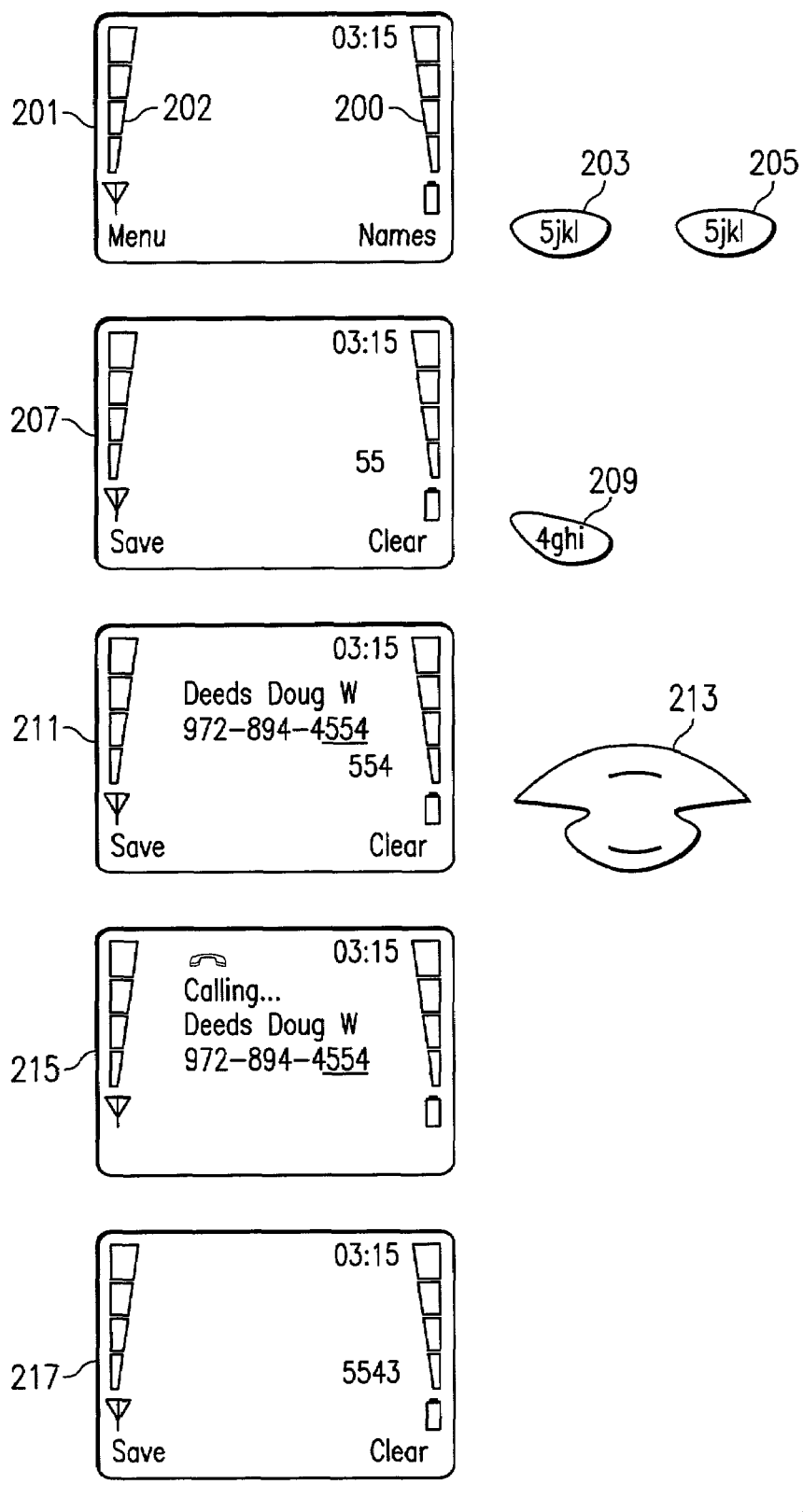
FIG. 2a shows possible displays and applicable keys for operating an unkeylocked embodiment.
Figure 3:
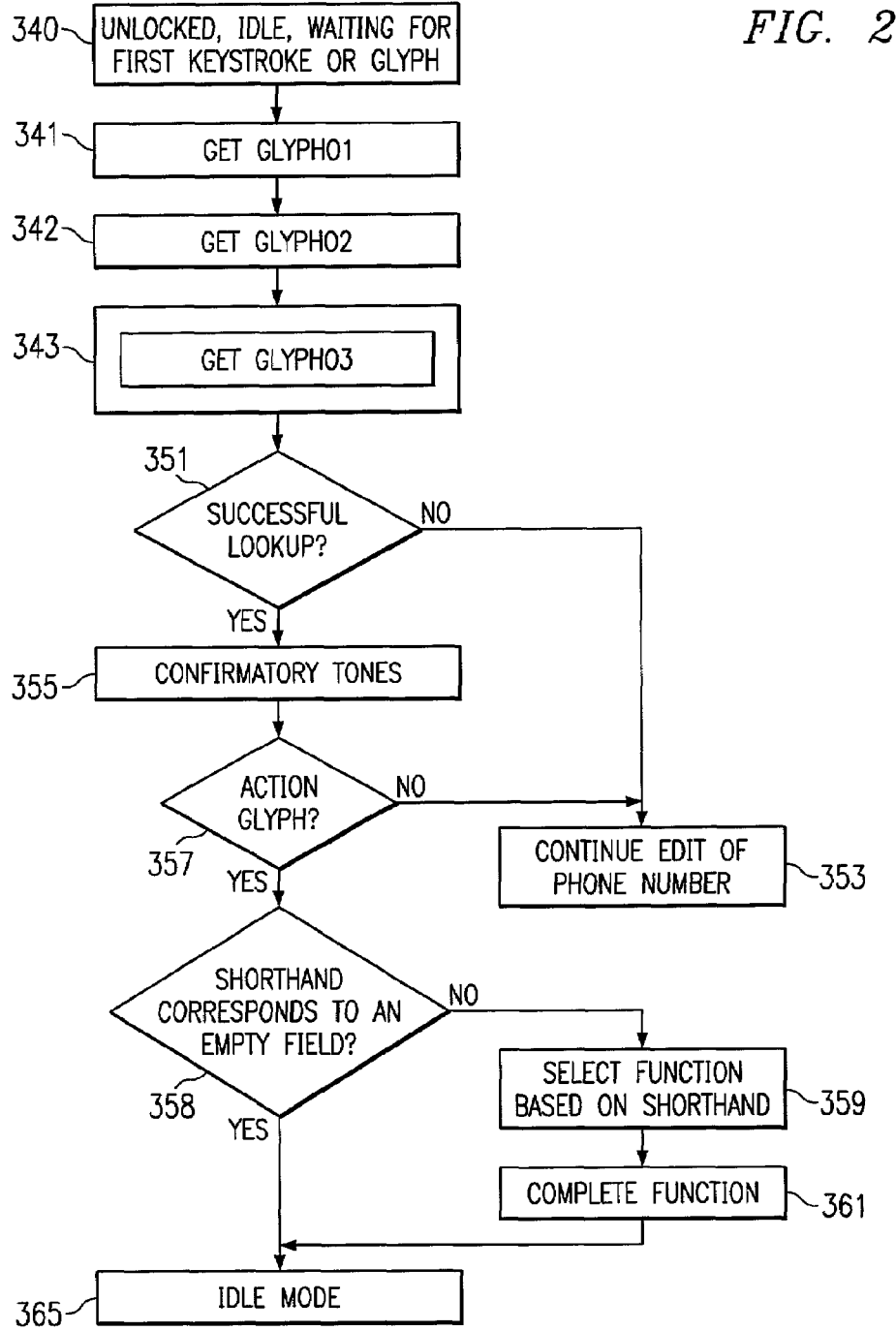
FIG. 3 shows a flowchart for receiving glyphos with an alternate branch for continued telephony number editing in case of a failed match.

FIG. 3 shows the steps of an unkeylocked embodiment. Operation of stored 3keys may proceed operate in an unkeylocked embodiment. The mobile phone may display an idle-mode screen 201 of FIG. 2A, shown as idle block 340 in FIG. 3. The display may include a antenna 200 and meter battery 202. The idle state necessarily has no accumulated digits in a register or other memory allocated for editing a telephony string (e.g. a telephone number). If the phone is set up with 3keys all having three digits, then the entry of the first two digits occurs as in the prior art, e.g. a first key is pressed 203 and a second key 205 is pressed to yield a displayed two digit number on the display 207. Typically, a first key press entered, while a mobile station is in an idle mode, moves the mobile phone into a distinct state of edit mode or edit state. FIG. 3 shows a first key signal is received 341 and a second key signal is received 342. A third key entry 209 may occur. The third key is received 343. The embodiment may attempt a look-up and match of the three keys that were entered. If a query 351 of the local database returns a phonebook entry associated with the 3key, a numeric field of the entry or record is returned as a matched signal. Other fields of a record may be returned, e.g. an alphanumeric field, which usually contains a more meaningful name for a telephony number of the record. Whatever the field or fields returned, the at least one such field returned may be a phonebook string.

FIG. 2A shows that when a phonebook string is returned, as much of the phonebook string as may fit in the display may be presented 211. FIG. 3 shows that feedback by display and even confirmatory tones 355 may occur. In the case of the matching screen 211, both an alphanumeric field, "Deeds Doug W", and a corresponding telephony field, 972-894-4554, are displayed. One or the other field may be displayed in the embodiment. Moreover, if the alphanumeric field is too wide, a portion of it may be displayed. A highlighting of the 3key as it appears in the numeric field may occur. In this case, the highlighting comprises an underscoring of the digits '554', although it is appreciated that changes in color, background, text size, font, and bold-facing all may equally well emphasize the 3key in a numeric field. A redundant representation of the 3 digits elsewhere on a mobile station may also operate to highlight the 3key in relation to the matching record. A similar manner of highlighting a 3key may occur in other instances where a phonebook string is obtained. Other circumstances where a phonebook string is obtained include retrieval by automatic number identification (ANI), infrared receipt of a telephony number and browsing through an established database of phonebook entries, as is known in the art.

A matched display 211 may occur, which may highlight a triplet in a telephone number of the phonebook record. A conservative dialing embodiment may require that the user may enter an action glypho 357, e.g. a scroll-key, before the mobile station attempts to make a wireless communication. Depressing a scroll-up button 213 may produce a suitable action glypho. The use of the action glypho may trigger calling of the primary number associated with the 3key, and call progress may be displayed to the screen 215, while a call attempt is made. The exact function selected may depend on a shorthand, which may be timing based, or based on the action glypho 359. One function that may be selected may be a detection of presence stored or reported by a mobile station that is responsive to a telephony number in the field of the matching record. Such a function may be one of several functions initiated in relation to a record entry—i.e. a follow-up call may be initiated following a presence check.

A user may ignore the offered match 215, obtained by looking up, by adding a fourth and later digits, thus making a full telephone number entry. A fourth digit would trigger the negative branch in the test for an action glypho 357. The user may then continue to edit the phone number 353. Conventional operation of the edit keys may operate if this course is selected by the user, i.e. a use of a scroll key after a user enters a fourth digit will result in normal cursor movement. Alternatively, FIG. 2B shows a 3key entry followed by a fourth button press as a four-digit number 217 being edited.

Figure 2B:
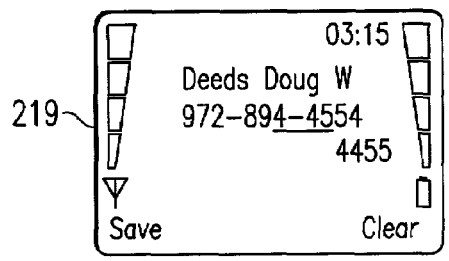
FIG. 2b shows additional displays.

In FIG. 2B the phonebook entry for "Doug Deeds" is also associated with a 3key "455". Editing 353 of a phone number may operate according to U.S. patent application Ser. No. 09/875,493. For example, a fourth digit "5" is added to the 3key, which is not inconsistent with a string of digits that is unique in the phonebook of this example, i.e. the four digits may satisfy a criteria of a substring match, of U.S. patent application Ser. No. 09/875,493, in which case, the match 301, may be persistently displayed until a non-matching digit is entered by the user. Similarly, a press of a 'talk' button may actuate a call to a phone number found in the phonebook record that continues to be displayed as a match, according to U.S. patent application Ser. No. 09/875,493 which is incorporated by reference.

A user may abort continued entries when the offered match appears by pressing an 'end' key or a 'clear' key. A failure to lookup a record in the lookup step 351 results in continued phone number editing 353.

An aggressive embodiment may do away with requiring a fourth glypho, and proceed to make a (wireless) communication by default. In other words, waiting for an action glypho or other signal 357 would be skipped. Such an embodiment would exist in one of at least two forms. A first form would be to initiate a wireless communication, where the radio environment permits it, based on the retrieved phonebook record match as is known in the art. In other words, the call is made without waiting for a follow-up action glypho and merely initiates calling activity when the final address glypho is received.

A second form would be to initiate a wireless communication after a suitable delay to permit a user to examine the display for inaccuracies. A timeout would occur following the final address glypho entered ('4' in the case of our example). Shortly after the timeout, the communication attempt may be made. If an abort signal were to be received before expiration of the timeout, then the communication attempt would be stopped, and the communication device may be returned to an idle mode 365. The execution of a short delay period, set by e.g. a timeout timer, is known as abort pausing.

It may be helpful to highlight a 3key in instances where significant parts of a phonebook record are displayed to a display of, e.g. a mobile station, and such a phonebook record has a 3key associated with it. Some circumstances where prior art devices display part of a phonebook record include when a call is being received, when a database is being browsed, and when a text message has arrived.

When a call is received, a prior art mobile telephone may show the telephone number of the called party when the Automatic Number Identification (ANI) is available. Moreover, it is known to use such ANI data to lookup telephone numbers in a phonebook database, and display an alphanumeric name for the phonebook record that matches such ANI data. To better inform a user of the prior art mobile telephone, the name from the phonebook is displayed when an inbound call occurs. To better assist in learning 3keys as disclosed by this invention, an embodiment may further look up in a 3key field the 3key associated with such a record. FIG. 4, shows how a 3key 501 may be displayed contemporaneously with a phonebook name field 503. Such fields may be displayed at the same time. Alternatively, the 3key may be displayed, followed by displaying the phonebook name field, and generally showing each field, e.g. the 3key field, at different intervals than the other field, e.g. the phonebook name field.

Another way to provide feedback when a telephony string is obtained includes obtaining a glypho address that is associated with the telephony string using a look-up based on any received ANI. Since a glypho address is composed of at least two digits, and at most three digits, at least two of those digits may be presented to the user as a glypho address presentation (GAP). The GAP may be output in several ways.

One way to rapidly output a GAP is to take the most significant digit place and output it in an encoded vibration, using, e.g. a vibrating motor. One such encoding might be a 'Big Ben' encoding, wherein a sequence of similar duration buzzes, counting between one and nine corresponding to the digits one through nine of, e.g. the most significant digit place of a glypho address. A second type of buzz or vibration may occur to represent a zero, e.g. a longer steady buzz. A second digit, e.g. the second most significant digit place, may be encoded with a buzz or a sound from a speaker. Equal duration vibrations or sounds may also use the 'Big Ben' encoding for the second digit. If a buzz is used on a first digit, and a beep is used on a second digit, then the sequence of buzzes may be made to overlay the sequence of beeps so at least one buzz occurs simultaneously with a beep. This may speed a user's ability to recognize the first two digits of a glypho address.

Alternatively, a pause between each sequence of buzzes and beeps may emphasize that a first digit has concluded, and a second digit has begun being presented. A third digit may easily be presented in this way, following a first two sequences for the first two digits.

Since it is believed that a distribution of 3keys will be sparse, particularly in a 3key space that include digits 000 to 999 (less any special triplets), it may be practical to encode a digit using less precise encoding. For example, a second type of tone, which may be two simultaneous tones, or a high tone that changes pitch to a different tone may be used for a second digit to indicate, by the number of sounds, the size of the digit—and, by virtue of the secondary tone sound, hint that the third digit, if any, is in a certain band from zero to nine, e.g. the digits zero to four inclusive.

Table 3 shows how encodings may work, wherein the encodings may be played to confirm and feedback that a valid 3key was entered, or to announce an inbound communication from a telephone number that is in a phonebook database and has an associated 3key. Row A shows an encoding for a 3key of 591. First the '5' is encoded as five vibrations, e.g. a vibration motor vibrates a digit of a 3key. Then the '91' is encoded as nine two-tone sounds, e.g. a speaker sounds at least a second digit. The '5' encoding may be played first, followed by the '91' encoding. The '5' encoding may alternatively be played to occur simultaneously with the first five tones of the '91' encodings.

TABLE 3

| | Digit(s) | Sequence | Characterization |
|---|---|---|---|
| A | 5 | * * * * * | Five vibrations |
| | 91 | -.-.-.-.-.-.-.-.- | Nine two-tone sounds |
| B | 5 | * * * * * | Five vibrations |
| | 98 | - - - - - - - - - | Nine single-tone sounds |
| C | 5 | * * * * * | Five vibrations |
| | 9 | - - - - - - - - - | Nine single-tone sounds |

Encoding of a '98' may be a sequence of nine single-tone sounds, which is shown in row B. The single-tone may indicate that the third digit is a high digit. Row C may show a 3key embodiment where no 3key has more than two digit places, i.e. the '9' digit is simply a set of nine sounds. A vibrate motor may vibrate the first digit of a 3key as a sequence of buzzes. A speaker may sound the second digit of a three key as a single-tone sound.

An advanced embodiment may have LEDs that light up under or near keypad surfaces. These LEDs comprise a type of non-display light because they are not integrated into a conventional planar information display for better illumination. It may be helpful to display a 3key by lighting an LED that is in close proximity to a keypad that has a digit marking matching a digit of a 3key, wherein such an LED is also known as a keypad LED. In other words, following receipt of the ANI data and looking up a 3key, one or more LEDs that correspond to the 3key address may be lit by the embodiment.

Returning to FIG. 1A, in embodiments where the pause criteria is uniform, regardless of the distance between keys, it may be unnecessary to check an interglypho to see if it was short enough to satisfy a shorter interglypho pause criterion as may be set for signals received from adjacent keys. Thus steps 111 and 119 may be optional. Similarly, if it is a mere 3key that is desired to be obtained, the other timing steps may also be optional, including 103, 105, 109, 113 and 117. Timing data may be less relevant where the keys are entered in a unkeylocked embodiment.

It is common in most digital mobile phones and other mobile stations for users to receive messages carrying readable text, e.g. in ASCII codes. Invariably, such messages are transmitted in one or more packets. One or more of these packets carrying, e.g. a short text message, carries a return routing information, which may be the telephone number of the sender, among other things. A mobile station obtains a phonebook string when this occurs, wherein a packet bearing a return routing information is received.

Another way that a mobile station may obtain a phonebook string is when a user navigates among several phonebook entries through the use, e.g. of a navigation key, such as a scroll-key or a miniature joystick. Other methods of navigation are known in the art, suffice it to say, that one or more phonebook strings may be substantially displayed on screen.

FIG. 4 shows a way to associate or pair a triplet with a record. A first step may be to identify 401 a set of triplets in a current record, i.e. a newly added record or a record not yet having an associated triplet. This step may be followed by a step of selecting a 'used triplet' criteria 403. The used triplet criteria may be strict. The triplets may be sorted or otherwise ordered for processing in a preferential order, such as, preferring triplets that originate from a significant digit place wherein such triplets are likely to be randomly distributed in a user's present or future phonebook 405.

According to the used triplet criteria (UTC), a first triplet among the triplets of the record is determined to be either used or not used 407. If the triplet is used, then an exit criteria, e.g. is the triplet the final one available from the record 409, is applied. If the exit criteria is not met, a next triplet from the ordered triplets may be obtained 410. If the exit criteria 409 is met, then the UTC may be relaxed provided that a more relaxed UTC is available 411. Thus, checking for a more relaxed UTC, is a step to eliminate the broader criterion defining a used triplet. If a more relaxed 'used triplet' criterion is available, it is selected 415. Thus an association of a 3key address to a record may be based on a narrower criterion defining a used triplet. A suitable criterion, that may be narrower, may be that for a triplet to be used, the triplet must actually be associated with a record. Following relaxing the UTC, processing may continue with a starting the list off from the preferred triplet 405. After obtaining any next triplet 410, the next triplet may be evaluated against the current used triplet criteria 407.

Processing may end with a step of associating 413 a triplet found to not be a used triplet 407. However, if the step of determining if a more relaxed UTC is available 411 fails, the negative branch may take the algorithm to another conclusion—that of letting the user manually associate a triplet with the record 417.

FIG. 6 shows a block diagram of a communication device that may carry out the functions and equivalents described herein, such as, e.g. those of FIGS. 1*a* and 1*b*. An input device, e.g. character-entry device 601 receives inputs. One or more portions or keys of the character entry device may be a command entry device, e.g. a 'talk' or 'send' marked key. Such inputs may be associated with characters, symbols and functions. The character-entry device may depend on pressure, e.g. such as to a keypad to take character and other inputs. Character-entry device may obtain characters and other inputs encoded by means known in the art to an embedded processor 603, wherein the inputs may comprise a glypho address. Embedded processor 603 may provide outputs that are discernable to human beings in several forms, including visual displays, audio, and vibrations, which may be provided by output devices such as a display screen 605, a speaker 607 or a vibrate motor 609 respectively. Processor 603 may store and retrieve information from memory 611. Memory 611 may be preprogrammed with data and instructions. Memory 611 may be in a removable media. Communication device may be able to communicate with other devices through a transceiver 615. Transceiver 615 may be able to transmit and receive signals as electromagnetic signals or sound. At a minimum, transceiver 615 may be a transmitter. The transmitter may be a Dual Tone Multi-Frequency (DTMF) tone generator for providing tones on a pair of conductors. The transmitter may be a pulse generator providing pulses according to commonly known telephony switch protocols.

Although the invention has been described in the context of particular embodiments, various alternative embodiments are possible. As an example telephonic characters may include characters '*' and '#'. Applicant has defined "criteria" and "criterion" to mean one or more test conditions. Thus, while the invention has been particularly shown and described with respect to specific embodiments thereof, it will be understood by those skilled in the art that changes in form and configuration may be made therein without departing from the scope and spirit of the invention.

What is claimed is:

1. A method for changing at least one communication parameter for a communication device comprising:
   receiving a first glypho (G1) having a first glypho beginning and a first glypho ending and a first glypho duration;
   receiving a first address glypho (AG1) having a first address glypho beginning and a first address glypho ending and a first address glypho duration, wherein a time from the first glypho ending to the first address glypho beginning comprises a first interglypho duration;
   receiving a second glypho (G2) having a second glypho beginning and a second glypho ending and a second glypho duration, wherein a time from the first address glypho ending to the second glypho beginning comprises a second interglypho duration; and
   operating on data addressed by at least two of G1, first address glypho and G2 based upon each of the first glypho duration, the first address glypho duration, the second glypho duration, the first interglypho duration, and the second interglypho duration, wherein G1 comprises a second address glypho (AG2).

2. The method for changing at least one communication parameter of claim 1, wherein operating on data comprises:
   operating on data addressed by G1, first address glypho and G2.

3. The method for changing at least one communication parameter of claim 2 wherein operating on data comprises making a feedback.

4. The method of claim 3 wherein making a feedback comprises displaying a field of a record that matches an address comprised of G1, AG1, and G2.

5. The method of claim 3 wherein making a feedback comprises vibrating a vibrate motor.

6. The method of claim 3 wherein making a feedback comprises sounding a confirmatory beep.

7. The method of claim 3 further comprising making a wireless communication attempt.

8. The method of claim 7 wherein a step of abort-pausing occurs prior to the wireless communication attempt.

9. The method of claim 8 further comprising receiving an abort signal.

10. The method of claim 7 further comprising completing a wireless communication attempt.

11. The method of claim 2 further comprising displaying indicia to a display that the communication device is keylocked.

12. The method of claim 11 further comprising displaying indicia to the display that the communication device accepts three-key keylock override inputs.

13. The method of claim 1 wherein receiving a first AG1 is followed by highlighting a keypad substantially at a key wherein a signal made from pressing the key in part comprises a glypho address.

14. The method of claim 1 wherein operating on data comprises reconfiguring a database on the communication device.

15. The method of claim 1 wherein receiving the first glypho comprises receiving an action glypho.

16. The method of claim 15 wherein receiving an action glypho comprises receiving a softkey signal.

17. The method of claim 1 wherein receiving a first glypho does not include receiving a softkey signal.

18. The method of claim 17 wherein receiving a first glypho comprises receiving a navigation key signal.

19. The method of claim 17 wherein receiving a first glypho does not include receiving a key signal.

20. The method of claim 19 wherein receiving a first glypho comprises receiving a geometry configuration change signal.

21. The method of claim 1 wherein operating on data comprises looking up a record in a database.

22. The method of claim 21 wherein receiving a second glypho comprises receiving a scroll-key signal.

23. The method of claim 21 wherein operating on data comprises attempting a voice call based on the record.

24. The method of claim 23 wherein receiving a first glypho is preceded by a step of receiving a third glypho.

25. The method of claim 24 wherein receiving a second glypho comprises receiving a scroll-key signal.

26. The method of claim 24 wherein receiving a second glypho comprises receiving a digit signal having a long duration.

27. The method of claim 1 wherein receiving a first glypho is preceded by entering an idle state.

28. The method of claim 27 wherein receiving the second glypho does not comprise receiving a talk-key signal.

29. The method of claim 1 wherein operating on data comprises:
   looking up a record in a phonebook database based on an address comprised of the first address glypho and the second address glypho.

30. The method of claim 29 wherein operating on data comprises: using radio resources based on the address.

31. The method of claim 29 wherein operating on data comprises: performing a mobile station configuration change.

32. The method of claim 31 wherein operating on data further comprises:
   performing a change to the record.

33. The method of claim 31 wherein the record has an association with a first ringtone, and wherein performing a change to the record further comprises associating the record with a second ringtone.

34. The method of claim 1 wherein:
   a) the G1 comprises a keypad signal;
   b) the AG1 comprises a second keypad signal other than functional keypad signals; and
   c) the G2 comprises a third keypad signal.

35. The method of claim 34 wherein:
   a) the first keypad signal comprises a signal from a key mapped to a digit;
   b) the second keypad signal comprises a signal from a key mapped to a digit; and c) the second keypad signal comprises a signal from a key mapped to a 12-key.

36. The method of claim 35 wherein the 12-key comprises a digit.

37. The method of claim 36 wherein the second keypad signal comprises a signal from a key having an alpha-to-digit mapping.

38. The method of claim 37 wherein receiving the pre-glypho signal comprises not receiving a signal for a pause-criteria prior to the pre-glypho signal beginning.

39. The method of claim 37 wherein performing a function is based on the pre-glypho signal.

40. The method of claim 39 wherein operating on data further comprises making a wireless communication attempt.

41. The method of claim 37 wherein receiving the second glypho comprises receiving a navigation signal.

42. The method of claim 1 wherein:
a) the GI comprises a first voice signal; and
b) the AGI comprises a second voice signal.

43. The method of claim 1 wherein receiving a second glypho does not include receiving a send signal.

44. The method of claim 1 wherein receiving a first glypho further comprises not receiving a signal for a pause-criteria prior to the first glypho beginning.

45. The method of claim 1 wherein receiving a first glypho further comprises receiving a pre-glypho signal having a pre-glypho signal beginning and a pre-glypho signal end and a pre-glypho signal duration, wherein the pre-glypho signal end occurs in less than a pause-criteria prior to the first glypho beginning.

46. A communication device for changing at least one communication parameter comprising:
an input device for receiving:
a first glypho (G1) having a first glypho beginning and a first glypho ending and a first glypho duration;
a first address glypho (AG1) having a first address glypho beginning and a first address glypho ending and a first address glypho duration, wherein a time from the first glypho ending and the first address glypho beginning comprises a first interglypho duration; and
a second glypho (G2) having a second glypho beginning and a second glypho ending and a second glypho duration wherein a time from the first address glypho ending to the second glypho beginning comprises a second interglypho duration;
a memory storing instructions; and
an embedded processor, wherein the instructions, when executed by the embedded processor cause the communication device to operate on data addressed by at least two of G1, first Address Glypho and G2 based upon each of the first glypho duration, the first address glypho duration, and the second glypho duration, the first interglypho duration, and the second inter glypho duration, wherein G1 comprises a second address glypho (AG2).

47. The communication device for changing at least one communication parameter of claim 46, wherein the instructions when executed by the embedded processor cause the communication device to operate on data addressed by G1, first address glypho and G2.

48. The communication device of claim 47 further comprising an output device making a feedback.

49. The communication device of claim 48 wherein the output device making a feedback comprises a display displaying a field of a record that matches an address comprised of G1, AG1, and G2.

50. The communication device of claim 47 wherein the output device making a feedback comprises a vibrate motor vibrating a vibrate motor.

51. The communication device of claim 47 wherein the output device making a feedback comprises a speaker sounding a confirmatory beep.

52. The communication device of claim 47 further comprising a transceiver for making a wireless communication attempt.

53. The communication device of claim 46 wherein the input device for receiving a first glypho further comprises a keypad LED for highlighting a keypad substantially at a key wherein a signal made from pressing the key in part comprises a glypho address.

54. The communication device of claim 46 wherein the instructions when executed by the embedded processor further cause the communication device to reconfigure a database on the communication device.

55. The communication device of claim 46 wherein the instructions when executed by the embedded processor cause the communication device to operate on data by looking up a record in a database.

56. The communication device of claim 46 wherein the input device receiving a second glypho comprises a scroll-key.

57. The communication device of claim 46 wherein the instructions when executed by the embedded processor cause the communication device to operate on data by
looking up a record in a phonebook database based on an address comprised of the first address glypho and the second address glypho.

58. The communication device of claim 46 wherein:
a) the G1 comprises a keypad signal;
b) the AG1 comprises a second keypad signal other than functional keypad signals; and
c) the G2 comprises a third keypad signal.

59. A method comprising:
receiving a first glypho (G1) having a first glypho beginning and a first glypho ending and a first glypho duration;
receiving a first address glypho (AG1) having a first address glypho beginning and a first address glypho ending and a first address glypho duration, wherein a time from the first glypho ending to the first address glypho beginning comprises a first interglypho duration;
receiving a second glypho (G2) having a second glypho beginning and a second glypho ending and a second glypho duration, wherein a time from the first address glypho ending to the second glypho beginning comprises a second interglypho duration; and
operating, at a communication device, on data addressed by at least two of G1, AG1, and G2 based at least in part upon the first interglypho duration and the second interglypho duration.

60. A method according to claim 59, wherein operating on data comprises looking up a record in a phonebook database based on an address comprised of at least two of G1, AG1, and G2.

61. A method according to claim 59, wherein operating on data further comprises operating on data addressed by at least one of G1 and AG1 based upon each of the first glypho duration and the first address glypho duration.

62. A method according to claim 59, wherein G1 comprises a second address glypho (AG2).

63. An apparatus comprising a processor and a memory storing instructions that when executed by the processor cause the apparatus to:

receive a first glypho (G1) having a first glypho beginning and a first glypho ending and a first glypho duration;

receive a first address glypho (AG1) having a first address glypho beginning and a first address glypho ending and a first address glypho duration, wherein a time from the first glypho ending to the first address glypho beginning comprises a first interglypho duration;

receive a second glypho (G2) having a second glypho beginning and a second glypho ending and a second glypho duration, wherein a time from the first address glypho ending to the second glypho beginning comprises a second interglypho duration; and operate on data addressed by at least two of G1, AG1, and G2 based upon the first interglypho duration and the second interglypho duration.

64. An apparatus according to claim 63, wherein the instructions when executed by the processor cause the apparatus to operate on data by looking up a record in a phonebook database based on an address comprised of at least two of G1, AG1, and G2.

65. An apparatus according to claim 63, wherein the instructions when executed by the processor further cause the apparatus to operate on data addressed by at least one of G1 and AG1 based upon each of the first glypho duration and the first address glypho duration.

66. An apparatus according to claim 63, wherein G1 comprises a second address glypho (AG2).

67. A method comprising:

receiving a pre-glypho signal having a pre-glypho signal beginning and a pre-glypho signal end and a pre-glypho signal duration, receiving a first glypho (G1) having a first glypho beginning and a first glypho ending and a first glypho duration, wherein the pre-glypho signal end occurs in less than a pause-criteria prior to the first glypho beginning;

receiving a first address glypho (AG1) having a first address glypho beginning and a first address glypho ending and a first address glypho duration;

receiving a second glypho (G2) having a second glypho beginning and a second glypho ending and a second glypho duration; and operating, at a communication device, on data addressed by at least two of G1, first address glypho and G2, based at least in part upon at least two of the first glypho duration, the first address glypho duration, and the second glypho duration.

68. An apparatus comprising a processor and a memory storing instructions that when executed by the processor cause the apparatus to:

receive a pre-glypho signal having a pre-glypho signal beginning and a pre-glypho signal end and a pre-glypho signal duration, receive a first glypho (G1) having a first glypho beginning and a first glypho ending and a first glypho duration, wherein the pre-glypho signal end occurs in less than a pause-criteria prior to the first glypho beginning;

receive a first address glypho (AG1) having a first address glypho beginning and a first address glypho ending and a first address glypho duration;

receive a second glypho (G2) having a second glypho beginning and a second glypho ending and a second glypho duration; and operate on data addressed by at least two of G1, first address glypho and G2 based at least in part upon at least two of the first glypho duration, the first address glypho duration, and the second glypho duration.

\* \* \* \* \*

UNITED STATES PATENT AND TRADEMARK OFFICE
CERTIFICATE OF CORRECTION

| | | |
|---|---|---|
| PATENT NO. | : 7,574,237 B2 | Page 1 of 1 |
| APPLICATION NO. | : 10/144321 | |
| DATED | : August 11, 2009 | |
| INVENTOR(S) | : Rolnik et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1662 days.

Signed and Sealed this

Seventh Day of September, 2010

David J. Kappos
*Director of the United States Patent and Trademark Office*